US012638240B2

(12) United States Patent
Schlegel et al.

(10) Patent No.: US 12,638,240 B2
(45) Date of Patent: May 26, 2026

(54) DENTAL FURNACE AND PROCEDURES FOR THE OPERATION OF A DENTAL FURNACE

(71) Applicant: Ivoclar Vivadent AG, Schaan (LI)

(72) Inventors: Manuel Schlegel, Mels (CH); Martin Vogt, Balzers (LI); Dominik Müller, Altach (AT)

(73) Assignee: Ivoclar Vivadent AG, Schaan (LI)

( * ) Notice: Subject to any disclaimer, the term of this patent is extended or adjusted under 35 U.S.C. 154(b) by 973 days.

(21) Appl. No.: 17/815,540

(22) Filed: Jul. 27, 2022

(65) Prior Publication Data

US 2023/0032277 A1 Feb. 2, 2023

(30) Foreign Application Priority Data

Jul. 28, 2021 (EP) ..................................... 21188267

(51) Int. Cl.
F27B 17/02 (2006.01)
G05D 23/22 (2006.01)
(Continued)

(52) U.S. Cl.
CPC ....... F27B 17/025 (2013.01); G05D 23/2401 (2013.01); H05B 1/025 (2013.01); G05D 23/22 (2013.01); G05D 23/27 (2013.01)

(58) Field of Classification Search
CPC .................. F27B 17/025; F27D 19/00; F27D 2019/0006; F27D 21/0014; F27D 17/10;
F27D 2019/0003; F27D 2019/0034; F27D 99/0033; G05D 23/22; G05D 23/2401; G05D 23/27; G05D 23/19; G05D 23/1917;
(Continued)

(56) References Cited

U.S. PATENT DOCUMENTS 11,157,027 B2 10/2021 Gu et al.
2009/0225806 A1 9/2009 Lorunser et al.
(Continued)

FOREIGN PATENT DOCUMENTS

DE 914953 7/1954
KR 101848316 B1 4/2018
KR 20200142918 A 12/2020
WO 2021/001561 A1 1/2021

*Primary Examiner* — Steven W Crabb
*Assistant Examiner* — Ket D Dang
(74) *Attorney, Agent, or Firm* — Ann M. Knab; Thad McMurray

(57) ABSTRACT
A dental furnace, in particular for the pre-drying of dental restoration parts or for the debinding of dental restoration parts, with a heating chamber and at least one electric heating element, a power control device for the heating element, a temperature detection device with which the temperature in the heating chamber can be detected is provided. The temperature detection device is designed in particular as a thermocouple or as an optical temperature measuring system for direct detection of the temperature of the dental restoration system. A process control device is connected to the temperature sensing device and to the power control device for controlling the power control device. The process control device comprises a current control device with which, in particular in the absence of a measuring signal of the temperature detection device, the power control device can be controlled.

15 Claims, 8 Drawing Sheets

(51) Int. Cl.
| | | |
|---|---|---|
| *G05D 23/24* | (2006.01) |
| *G05D 23/27* | (2006.01) |
| *H05B 1/02* | (2006.01) |

(58) Field of Classification Search
CPC ........... G05D 23/1919; G05D 23/1934; H05B
1/025; H05B 1/0244; H05B 1/0247;
A61C 13/20; C23C 16/4412; F24C
15/2007; F24C 3/004; F24C 3/124; F24C
3/128; G05B 19/042; G05B 2219/25252;
H02M 1/12; H02M 1/4208; H02M
1/4216; H02M 1/4233; H02M 5/458;
H10N 10/13; Y02B 70/10
USPC ........................................................ 219/413
See application file for complete search history.

(56) References Cited

U.S. PATENT DOCUMENTS

| | | | | |
|---|---|---|---|---|
| 2010/0213185 A1* | 8/2010 | Miller | ................. | F27D 99/0006 |
| | | | | 433/32 |
| 2013/0032586 A1* | 2/2013 | Miller | ................... | F27B 17/025 |
| | | | | 219/398 |
| 2014/0231408 A1* | 8/2014 | Jussel | ................... | F27B 17/025 |
| | | | | 219/425 |
| 2021/0288586 A1 | 9/2021 | Soler et al. | | |
| 2022/0146102 A1 | 5/2022 | Yang et al. | | |
| 2022/0217816 A1 | 7/2022 | Haslett | | |

* cited by examiner

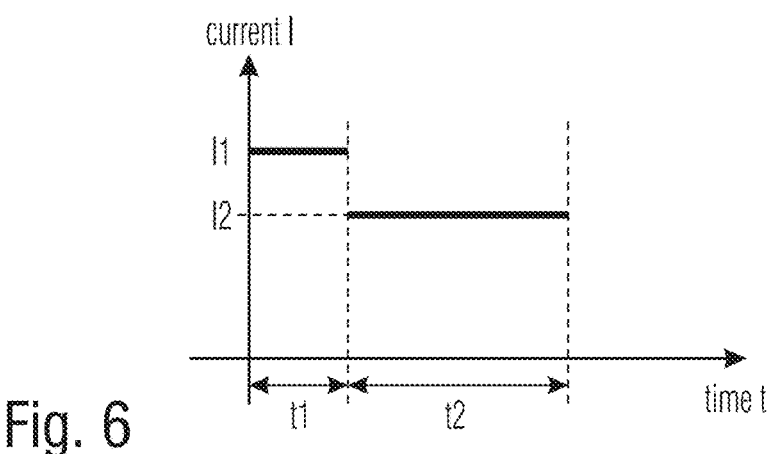
Fig. 6
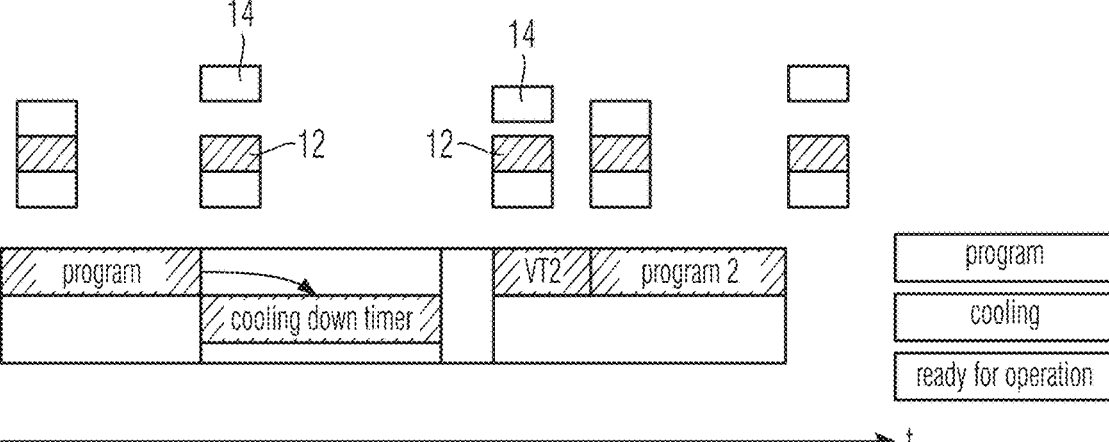
Fig. 7
Fig. 8

| condition | t_duration [min.] | t_max [°C] | t_open [°C] | t_cool measured [min] | t_cool estimated [min] | notes |
|---|---|---|---|---|---|---|
| P1 e.max CAD Superspeed crystallisation | 10 | 870 | 800 | 7.0 open 9.0 closed | 9.1 (polynomial 2) | 14 min with Lookup table |
| P5 e.max CAD correction/paint colour/ glaze firing | 19 | 860 | 700 | 7.1 open 8.0 closed | 9.2 (polynomial 2) | 19 min with Lookup table |
| P7 e.max ZirCAD MT Multi Standard | 75 | 1510 | 1200 | 27.1 open 35.0 closed | 37.7 (polynomial 2) | 35 min with Lookup table |
| P8 e.max ZirCAD LT Speed | 29 | 1480 | 1200 | 22.6 open 30.0 closed | 33.6 (polynomial 2) | 35 min with Lookup table |

Fig. 14

DENTAL FURNACE AND PROCEDURES FOR THE OPERATION OF A DENTAL FURNACE

CROSS-REFERENCE TO RELATED APPLICATIONS

This application claims priority to European patent application No. 21188267.5 filed on Jul. 28, 2021, which disclosure is incorporated herein by reference in its entirety.

TECHNICAL FIELD

The invention relates to a dental furnace according and a method for operating a dental furnace.

BACKGROUND

A known dental furnace has a heating chamber with at least one electric heating element, a power control device for the heating element, and a temperature detection device with which the temperature in the heating chamber can be detected. The temperature detection device is, in particular, a thermocouple or an optical temperature measuring system for direct detection of the temperature of the dental restoration part formed. The dental furnace is designed with a process control device which is connected to the temperature detection device and to the power control device for controlling the power control device.

"Dental furnace" is understood here to include all devices which can be used for the heat treatment of dental materials. These include heat treatment processes such as the firing and sintering of dental ceramics and dental pressing devices (pressing furnaces), including the preheating of press muffles, or debinding devices and even dental hot polymerization devices.

Dental furnaces are used on the one hand as kilns and on the other hand to a large extent as press furnaces to bring or to fire dental restoration parts consisting of a dental ceramic into the desired shape. A prerequisite for a good firing result is that the temperature profile prescribed by the manufacturer, the so-called burning curve, is strictly adhered to.

For this purpose, high-quality thermocouples are typically used in dental furnaces, which are calibrated in advance, and which record the temperature curve at the measuring point with an accuracy of a few degrees and even a few tenths of a degree.

Compared to the accuracy of such a thermocouple, the spatial maintenance of the temperature drops significantly. Consequently, within heating chambers, typical temperature gradients are several 10° C. or even over 100° C. in size.

Rapid heating can even result in temperature differences of more than 200° C.

This applies in particular to press furnaces, because the muffle used in the press furnace has a significantly higher heat capacity increase compared with the individual dental restoration parts, so that it heats up more slowly. The temperature measured by the thermal element at the surface of the muffle may then be, for example, 800° C., while the ingot in the muffle, for example, is only 400° C. hot.

Such measurement errors are taken into account by quite complicated specifications for the combustion curves of the manufacturers, which then also depend on the muffle size, so that a firing with a 300 g muffle proceeds significantly differently than with a 100 g muffle.

In this respect, the use of an expensive thermocouple for temperature detection has the disadvantage that despite the high intrinsic measurement accuracy, the temperature at the relevant point, i.e., on the objects being fired, cannot be precisely recorded. Furthermore, it has already been proposed to carry out the temperature measurement via the resistance value of the metallic heating wire. Typically, the resistance of a heating wire increases with temperature.

DE 914 953 A describes an electric kiln for a dental restoration part with a resistance-heated combustion chamber, which, when a working temperature is reached, is kept constantly at this temperature by means of a regulator. U.S. 20130032586, 20090225806 and copending commonly assigned U.S. Ser. No. 17/624,654, are directed to dental ovens and are hereby incorporated by reference in their entirety. US20220146102, US 20220217816, 20210288586, and 11157027 are directed to current control and are hereby incorporated by reference in their entirety.

In a dental furnace, it is crucial for the quality of the objects processed in the furnace that the thermal process, i.e., the temporal course of the energy introduced into the object, can be controlled and reproduced. As a rule, the process is controlled via one or more temperature measuring elements built into the furnace. In the case of high-temperature furnaces, these are preferably thermocouples or optical temperature detection devices.

Based on the temporal course of the energy introduced into the object, a temporal course of a temperature distribution is established within the object dependent on its geometry (mass, etc.) and material properties (mainly heat conduction).

The temperature in the object is decisive, among other things, for the changes in the material properties required by the processing step, such as sintering, crystallization, debinding, drying, etc. The better the temperature curve in the object can be controlled, the better the processing step can be controlled and the better the resulting object properties such as final density, strength, colour, translucency, shape, structure, etc. can be controlled.

Typically, the energy input into the object is detected indirectly via one or more temperature sensors in the firing/sintering chamber. By means of thermocouples, the temperature is measured at one or more locations in the combustion chamber or with the position correlated with the temperature in the combustion chamber. This temperature is assumed to correlate with the temperature on the object, which in turn correlates with the input of energy into the system. In the case of a dental furnace, at least one section of the wall of the combustion chamber can be opened in order to introduce the objects being fired into the combustion chamber. It is known to open a combustion chamber head from above in order to lower a dental restoration part from above into the combustion chamber and to raise it up again on a so-called "presenter", i.e., a presentation plate, from the combustion chamber.

The system is designed for operation with the combustion chamber closed. However, there are some process steps that take place with at least partially open combustion chambers (e.g., pre-drying during wet restorations, cooling). In these process steps, the ambient air cools the thermocouple, so that the information that can be obtained via the thermocouple is no longer precise.

SUMMARY

The invention, on the other hand, is based on the object of creating a dental furnace, which is improved with regard to a reproducible, thermal process without incurring any relevant additional costs. The object is solved by the claims. Advantageous further developments result from the dependent claims.

According to the invention, it is provided that the process control device or process controller of the dental furnace has a current control device or current controller with which the power control device or power controller can be controlled, in particular in the absence of a measuring signal from the temperature detection device or temperature detector. This makes it possible to support or to realize in an alternative manner the control of the power control in thermal processes with a current control, if critical heat-treating process steps are carried out, in which the temperature measurement via a thermocouple does not work correctly despite its high intrinsic accuracy.

According to the invention, a precise temperature measurement is possible, even if temperature monitoring by means of temperature sensors no longer works or no longer does so precisely. In order to design an energy input into the system of the combustion chamber independently of a control system working temporarily without a correct measuring signal, the current control device is designed with the function of transmitting control signals to the power control device, so that a constant current is transmitted to the heating element at a certain time over a defined time. In this way, a defined amount of energy is introduced into the system of the combustion chamber. It is accepted in this case that the temperature of the combustion chamber correlates with the temperature at the object, which in turn correlates with the energy input into the system.

In order to achieve high quality reproducible results after or during heat treatment processes with dental restoration parts, the current control device has at least one stored current control profile which can be run by the current control device over a time lapse, so that the power control device impresses a current into the heating element according to the current control profile over the time lapse.

In order to further improve the quality of the manufacturing of the dental restoration part, a particular current control profile from different current control profiles is preferably selectable, depending on the temperature detected in the combustion chamber, which can also be referred to as a heating chamber, and/or by the material of the heating element. In this way, the energy introduced and the energy to be introduced can be controlled even more precisely.

According to a further embodiment, the temperature detection is "intelligent", compact and integrated. In this embodiment, it is provided that the temperature detection device comprises the heating element itself and records the temperature of the heating element by determining the resistance of the heating element or parameters having the same effect, in particular by measuring the current when applying a voltage or measuring the voltage drop when an impressed current flows through the heating element.

As the age of the dental furnace increases, typically resistances of the power control, including those located outside the combustion chamber, increase. Consequently, a higher voltage drop occurs outside the combustion chamber and less heat is emitted inside the combustion chamber via the heating elements in comparison.

By means of the current control device according to the invention, it is ensured that the temperatures to be achieved are determined, e.g., that are necessary for pre-drying, so that the restoration parts are transferred from a damp state to a dry state. Resistance fluctuations in the course of the current path of the power control device play a lesser role for the combustion chamber temperature or the pre-drying temperature.

According to the invention, a method for the operation of a dental furnace is provided, in particular for the pre-drying of dental restoration parts or for the debinding of dental restoration parts, with a combustion chamber and at least one electric heating element, which is controlled by a power control device, with a temperature detection device with which the temperature of the dental restoration part is detected directly in the combustion chamber by a process control device connected to the temperature sensing device and to the power control device and with which the power control device is controlled.

Advantageously, the process control device comprises the current control device with which, in particular the power control device is controlled in the absence of a measurement signal of the temperature detection device. In this way, for example, a defined thermal energy can be introduced into the combustion chamber, independently of any temperature control, during pre-drying, when the combustion chamber is at least partially opened, or during the occurrence of exothermic processes in the furnace or during the evaporation of binding agents and solvents or, when flooding the combustion chamber with cold air or similar process steps.

In order to ensure that the heat treatment process is controlled and reproducibly feasible, the process control system checks before the start of pre-drying whether the temperature of the heating chamber is below a temperature threshold detected by the temperature detection device. If positive, the process control device is switched to a current control mode so that the control element is controlled by the current control device.

In an advantageous further development, the method according to the invention comprises the step that, as soon as an unusual increase in the temperature in the heating chamber is detected by the temperature detection device and transmitted to the process control device, the power control device is activated via the current control device with a current control profile that counteracts exothermic reactions. Debinding in particular is an exothermic reaction that can be compensated or controlled according to the invention.

In this way, an oscillation of the temperature, as it usually occurs during debinding, can be reduced. Oscillation occurs when exothermia occurs, causing the heating to stop and the heating system then heats up the combustion chamber as soon as the temperature of the thermocouple has fallen below a target value. The heating stops again as soon as an excessive warm-up, for example of the debinding material and strong exothermy is detected again. This oscillating stop-start operation can be reduced according to the invention. This effect is particularly problematic in small chambers, such as those used in the dental industry.

The heating element is fundamentally controlled by the process control device in a regular operation during the heat treatment process of the dental restoration part. This also applies when there is negative pressure in the combustion chamber. In an advantageous embodiment of the invention, when cold air is let into the combustion chamber the process control device is switched to a current control mode, so that the heating element is controlled by the current control device. The temperature sensing device does not provide reliable temperature readings when cold air is admitted. Therefore, the results of heat treatment processes in control mode according to a current control profile are more reproducible in such cases.

In order to protect dental restoration parts after the heat treatment process and not to damage dental restoration parts that have not yet been pre-dried by heating too quickly, the process control device starts a waiting time $t_{cool}$ from the time when the heat treatment by supply of electrical energy is stopped and the combustion chamber is opened and the waiting time $t_{cool}$ stops at the time in which the temperature of the heating chamber has fallen below a given value, in particular 400° C.

According to a preferred method according to the invention, the waiting time $t_{cool}$ is calculated from at least three parameters: the total heat treatment time $t_{duration}$ of the dental restoration part including a pre-drying phase and the heat treatment process, the maximum temperature achieved $T_{max}$ and the temperature achieved in a cooling phase $T_{open}$ at the time when the heating chamber is opened, the temperature being detected by the temperature control device. It is important to calculate the waiting time $t_{cool}$, because after opening the combustion chamber, the temperature is no longer accurate or no longer measurable at all. The parameters are recorded in the previous heat treatment process and used for the subsequent waiting time $t_{cool}$.

A particularly preferred method is characterized in that the waiting time $t_{cool}$ is calculated by forming a polynomial, particularly preferably a second-order polynomial, from the parameters, where a maximum value of the waiting time, in particular about 35 min, is fixed, and that the maximum value is used if the calculation results in a value above the maximum value. Surprisingly, it turns out that by forming a polynomial the waiting time $t_{cool}$ represents a precise calculation method to calculate the desired cooling of the combustion chamber.

In order to shorten production cycles of dental restorations and thus increase the production capacity, it is further preferred that no waiting time is calculated when a heat treatment process is interrupted, in particular during the first 20 sec, after the start of a pre-drying phase.

More preferably, the current control operation is usable in closed, partially or completely opened dental furnace (or regardless of the position of the head opening of the dental furnace). In this way, possible disturbances in the temperature detection, in which a control may be disrupted, especially for short periods of time, can be safely bridged.

In order to slowly bring wet dental restoration parts to the temperature for pre-drying and to avoid damage to them, the heating chamber is cooled below a defined temperature threshold before pre-drying, in particular to about 400° C., and the heating chamber is partially closed during pre-drying. Partial sealing has several advantages, for example, moisture can easily escape from the heating chamber.

BRIEF DESCRIPTION OF THE DRAWINGS

Further advantages, details and features result from the following description of several embodiments of the invention on the basis of the drawings.

FIG. 6 shows a time-current diagram of a heating element,

FIG. 7 shows a first cooling variant;

FIG. 8 shows a second cooling variant;

FIG. 9 shows a third cooling variant;

FIG. 10 shows a fourth cooling variant;

FIG. 11 shows a fifth cooling variant;

FIG. 14 shows a table with comparisons of the measured and estimated interval cooling time, stored in a lookup table under different process conditions.

DETAILED DESCRIPTION

Figure 1:
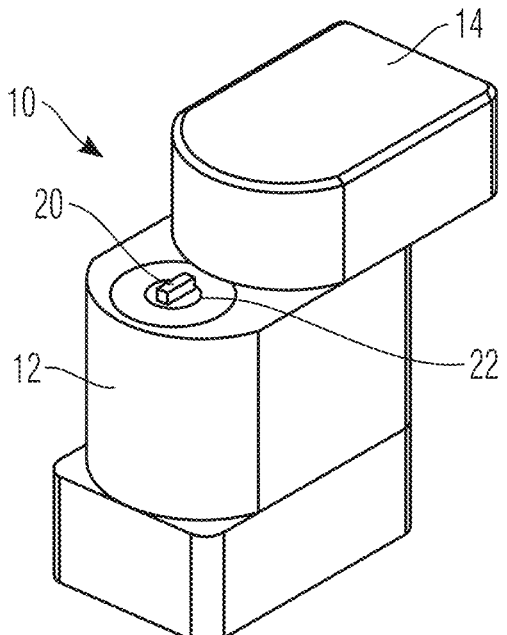
FIG. 1 shows a schematic dental furnace with an open furnace head in a first inventive embodiment.

FIG. 1 schematically shows a dental furnace 10 with a furnace head 12 and a cover 14, which is movable relative to the furnace head 12.

A combustion chamber 16 with at least one heating element 18 is formed in the furnace head 12. Within the combustion chamber 16, a receiving plate 22 can be moved vertically in height. A dental restoration part 20 is arranged on the receiving plate 22 in order to subject it to heat treatment. FIG. 1 shows the cover 14 opened to the rear to the maximum and the receiving plate 22 with a dental restoration part 20 moved up. In this position, the receiving plate 22 can be loaded with the dental restoration part 20 very easily.

Figure 2:
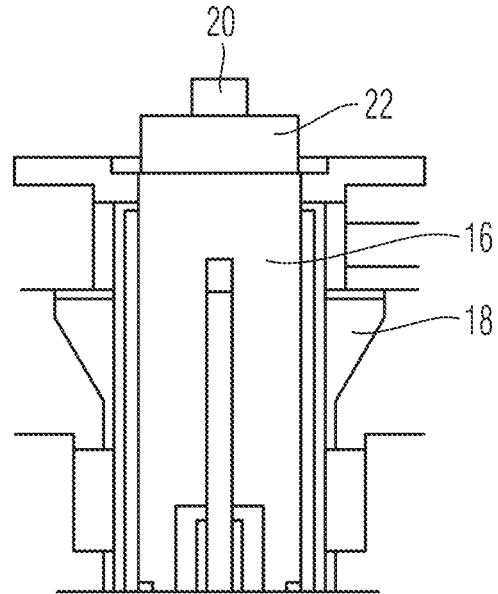
FIG. 2 shows a section of a cross-section of a combustion chamber of the dental furnace according to FIG. 1.

FIG. 2 shows in cross-section a section of the dental furnace 10 with the heating chamber 16 and adjacent heating elements 18 according to FIG. 1, i.e., a raised receiving plate 22 with a dental restoration part 20.

Figure 3:
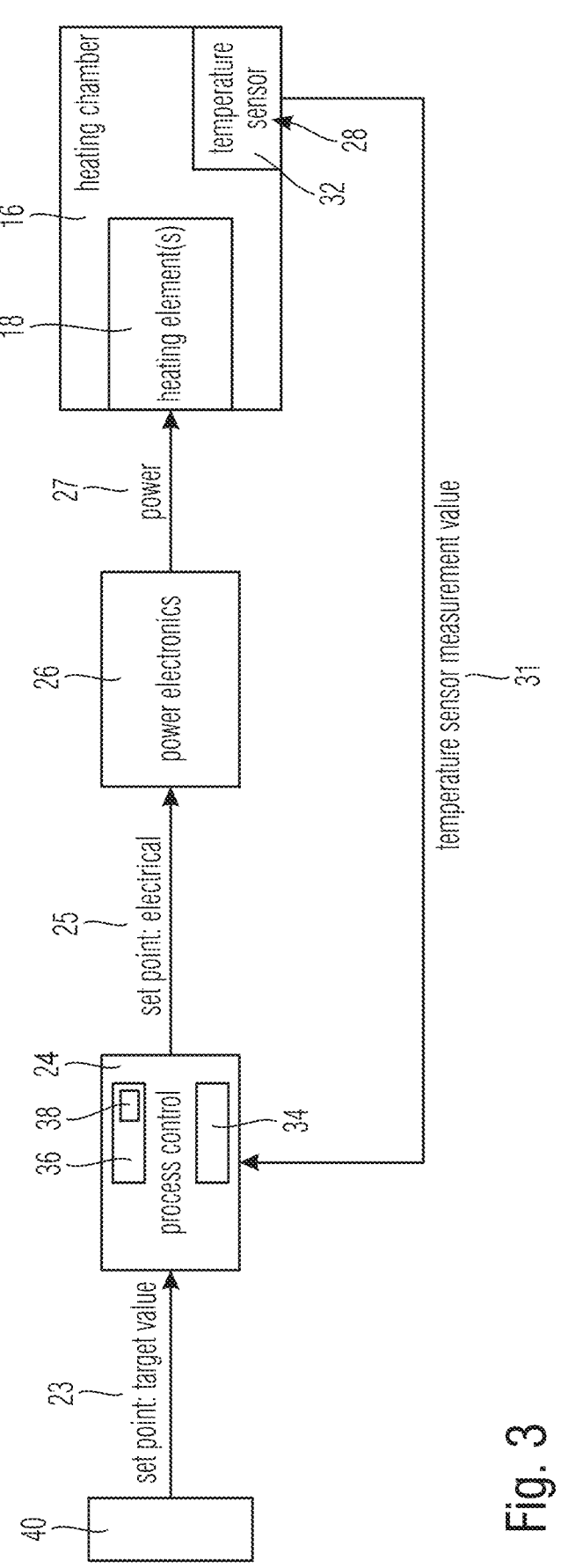
FIG. 3 shows a schematic circuit diagram of the dental furnace according to FIG. 1.

FIG. 3 shows abstractly a schematic of a circuit diagram of the inventive dental furnace 10. The dental furnace 10 comprises a superordinate furnace control 40, a process control device 24, a power control device 26 and a temperature sensing device 28.

The power control device 26 is designed as power electronics and outputs a power 27 to heating elements 18 in the combustion chamber 16. The combustion chamber 16 can also be called a heating chamber.

The temperature detection device 28 records the temperature in the heating chamber in various ways. A temperature sensor 32 is provided as a thermocouple or as an optical temperature measuring system for the direct detection of the temperature of the dental restoration part 20. Furthermore, a so-called intelligent temperature detection is also realized according to the invention. The temperature detection device 28 comprises for this purpose the heating element 18 and an electronic evaluation unit, which may be integrated in the power control. The temperature detection device 28 detects the temperature of the heating element 18 by determining the resistance of the heating element 18 or parameters acting in the same way, in particular by measuring the current when applying a voltage or measuring the voltage drop when flowing through the heating element with current.

The superordinate furnace control 40 has various, stored heat treatment programmes for the dental restoration part 20. A special heat treatment programme is selected by the user in an initialization step.

The superordinate furnace control 40 specifies a setpoint value 23 to the process control device 24. The process control device converts this setpoint 23 into an electrical specification control signal 25 and passes it on to the power control device 26, which acts on at least one heating element 18. The temperature detection device 28 detects the temperature in the heating chamber 16 by means of the temperature sensor 32. It is assumed that the recorded temperature in the heating chamber 16 corresponds to the temperature of the dental restoration part 20. The temperature sensor 32 passes on a measured value 31 to the process control device 24, so that in a control device 34 a control operation with regard to a given programme sequence takes place continuously.

The process control device 24 may include a current control device 36, with which, in the case of a missing, or possibly a defective measurement signal of the temperature detection device 28, the power control device 26 is controllable by means of the electrical preset control signal 25. The missing measurement signal may result from the fact that the temperature cannot be detected correctly or is not detected due to certain circumstances, in some cases, because cold air flows into the heating chamber or because the heating element has aged.

When pre-drying, the heating chamber is at least partially open. In this process step, the thermocouple is not in the usual position relative to the object, the dental restoration part, and the correlation between the temperature of the thermocouple and the object is no longer given. Also, when exothermic processes occur in the furnace, e.g., in the debinding and/or burning of residual organics, in the evaporation of binding and dissolving agents and in similar processes or process steps, temperature monitoring by means of temperature sensors is no longer possible or not precisely measured.

The current control device 36 is designed with the function of transmitting control signals 25 to the power control device 26, so that a constant current is delivered to the heating element 18 at a certain time over a defined time.

The current control device 36 comprises various current control profiles 38, which are selected depending on temperature measured values 31 from the temperature detection device 28 or depending on the selected heat treatment process or on a given material of the dental storage part 20. The stored current control profiles 38 can be run over a passage of time, so that the power control device 26 impresses a current according to the current control profile 38 over the passage of time into the heating element 18.

It is understood that the current control device 36 and/or the process control device 24 may also be designed as a part of the furnace control 40.

Figure 4:
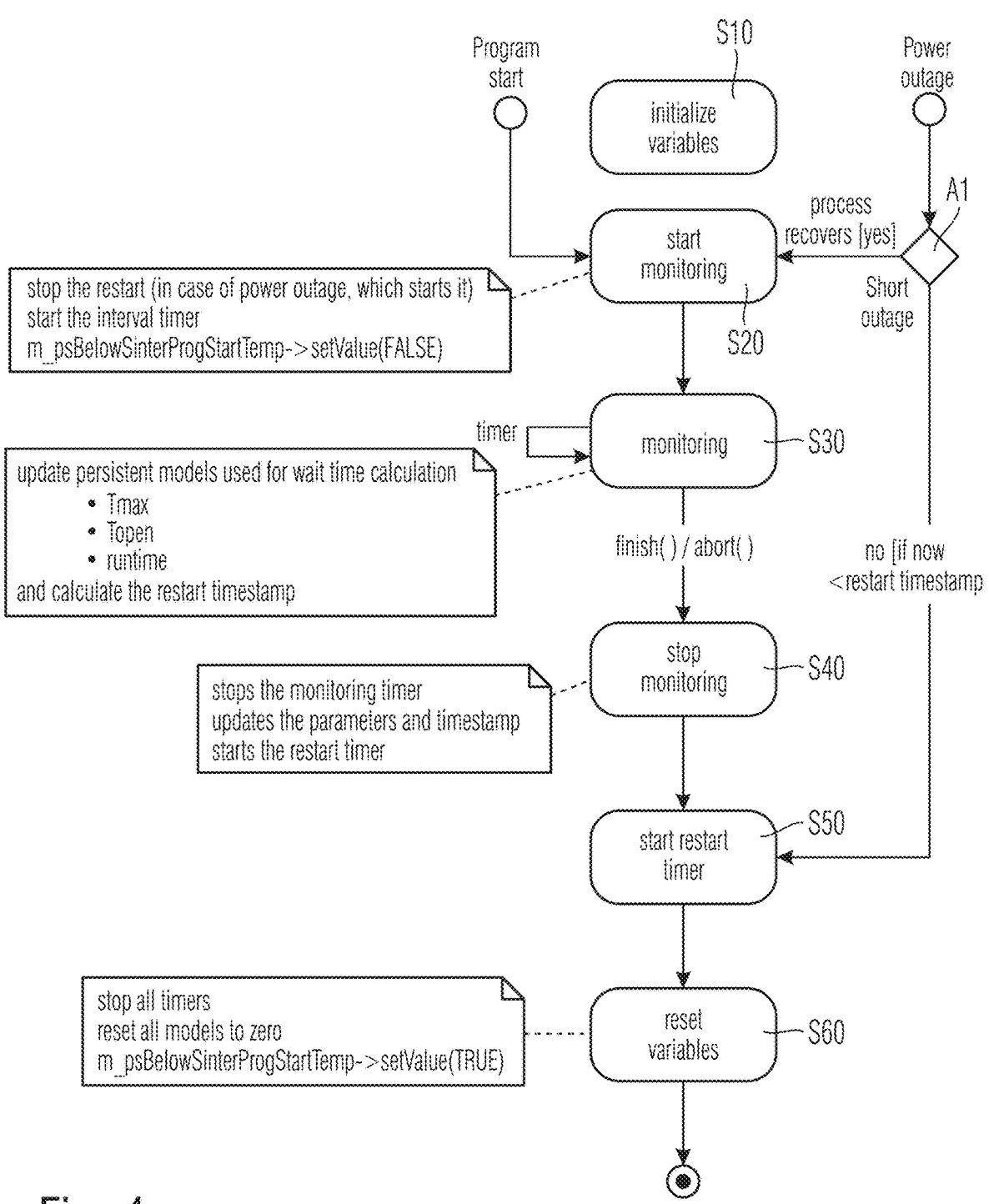
FIG. 4 shows a flowchart of a process for operating the dental furnace.

FIG. 4 shows a flow diagram of a method for operating the dental furnace 10 according to the invention. To prepare a heat treatment process, the dental restoration part 20 is arranged on the receiving plate 22. The receiving plate 22 travels vertically downwards into heating chamber 16. The covering 14 is then partially closed for pre-drying.

Due to the partially open heating chamber 16, the measurement values of the temperature detection device 28 are inaccurate.

In a first step S10 variables are initialized. The variables may be the material, the size, the approximate volume, the weight of the dental restoration part and/or the type of heat treatment determined by a programme selection. Damp dental restoration parts can be crystallized, glazed, or sintered. However, they must be dried beforehand. For this purpose, the damp dental restoration part is heated at a semi-open furnace head and the moisture is released into the environment.

In order for the pre-drying to work as desired, the environment and thus the restoration must be heated in a defined way. If temperature gradients on the dental restoration parts are too large in the still wet state, the formation of steam can cause cracks in the objects or defects on the surface or even in the component itself.

In a second step S20, the programme selected in step S1 is started. The furnace control 40 controls the process control device 24 to supply the heating element with electricity in a first operational phase of pre-drying in a control mode, i.e., without regulation to certain temperature values. In this operational phase, the temperature detection by the thermocouple may not be correct due to various influences: therefore, a control operation is performed with a current control device for the heating element. In the operating phase of pre-drying, the cover 14 does not completely close the heating chamber 16, so that temperature values measured by the thermocouple are not correct.

Furthermore, a regulation of the power in the heating chamber during pre-drying via the resistances of the heating element, may no longer be accurate enough with increasing aging, i.e., after about 1000 operating hours and more. Resistance of the connection technology of the dental furnace 10, which are arranged outside the heating chamber, increase with age. Consequently, a voltage drop occurs increasingly outside the heating chamber above the connection technology and less in the heating chamber above the heating element, with corresponding consequences for the heat dissipation. The consequence is that the necessary temperatures for pre-drying in the heating chamber are not reached or are too short and the dental restoration parts remain damp.

By switching to a current control mode with a current control during pre-drying, resistance changes and fluctuations in the connection technology no longer play a role.

At the same time, in the second step S20, a query A1 checks whether the programme has been terminated by interrupting the power supply or not. If an abort is detected within a defined programme runtime, for example during the first 20 seconds, a cooling time counter is stopped and an interval counter is started again from zero at the programme start. If an interruption occurs later, a counter for the cooling time, i.e., a counter when a heat treatment process can be carried out again, is started.

In a third step S30, which starts together with the second step S20, a counter is started that measures the time duration $t_{duration}$ from the programme start when the start button on the dental furnace 10 is pressed, to the timepoint at which the dental head 12 is opened by means of the cover 14 for cooling. In order to calculate a cooling time with high precision, two further parameters are recorded in step S30, the maximum temperature OT1 achieved in the programme from the start of the programme to the end of the programme and the temperature $T_{open}$. The temperature $T_{open}$ is the temperature OT1 of the dental furnace 10 until before the opening of the heating chamber, i.e., combustion chamber.

The process control device 24 regulates the power control 26 on the basis of temperature values as soon as the heating chamber 16 is closed by the cover 14 and as long as in a fourth step S40 the cover 14 again opens the heating chamber 16 after the heat treatment for a cooling and a restart for the heat treatment of a new dental restoration part.

In the fourth step S40, the time duration $t_{duration}$ counter is stopped and the parameter values described above are set and thus the time duration for the cooling time is determined or calculated.

In the fifth step S50, the cooling time counter starts, and it runs the length of time $t_{cool}$. Then, in the sixth step, S60, the variables set in the first step S10 for a new treatment process are reset to initial values or zero and all counters are set to zero.

Figure 5:
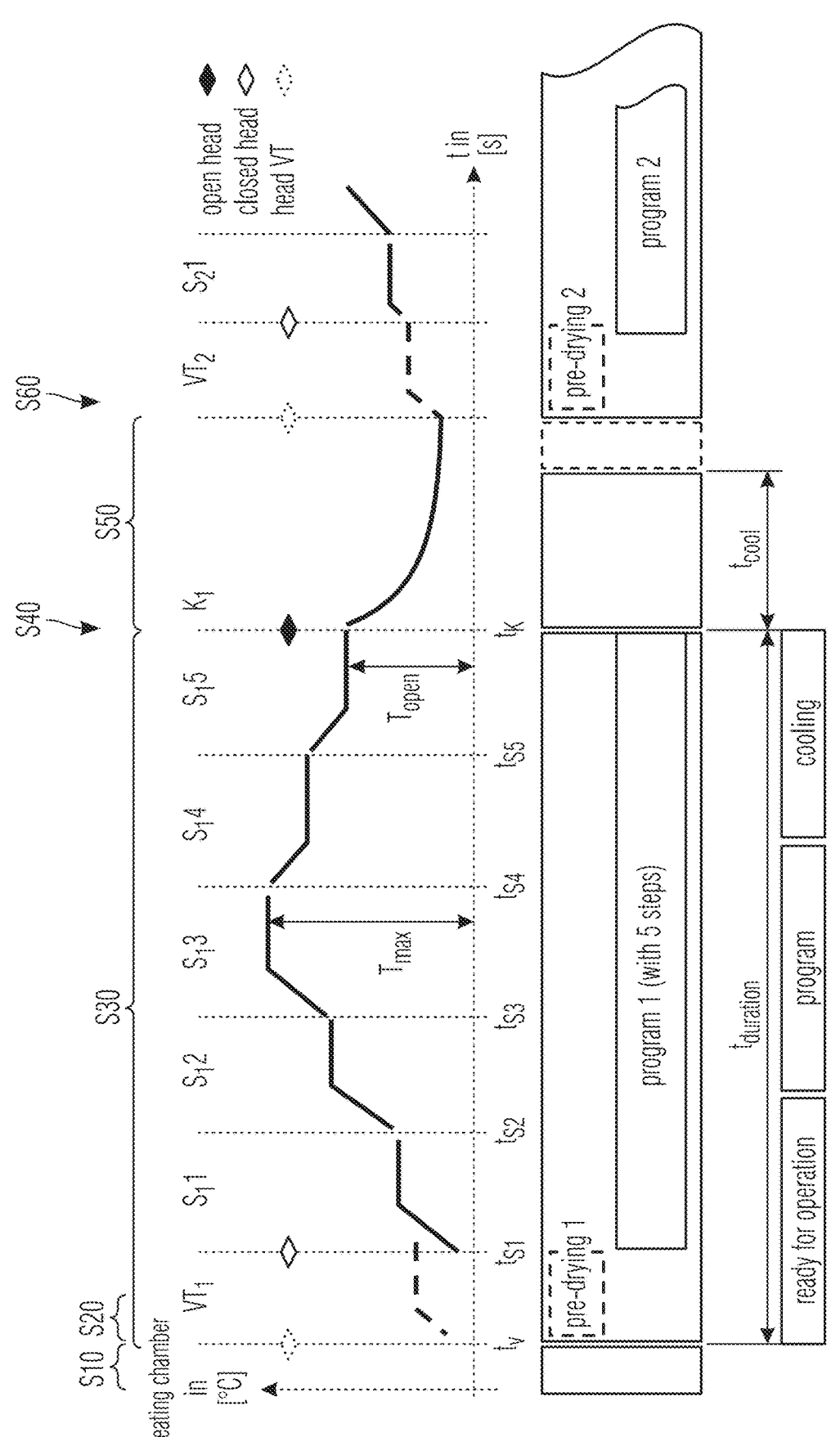
FIG. 5 shows a time-temperature diagram of an inventive process for the operation of the dental furnace.

FIG. 5 shows a time t-temperature T-diagram of a sequence of the operating procedure of a heat treatment process in the dental furnace 10 as stated in FIG. 4. For simplicity, the aforementioned process steps S10 to S60 from FIG. 4 are drawn in FIG. 5.

In a first step, the dental restoration part 20 is arranged on the receiving plate 22 and the receiving plate 22 travels vertically downwards into the heating chamber 16. The cover 14 is then partially closed for a pre-drying.

Due to the partially open heating chamber 16, measurement values of the temperature detection device 28 are inaccurate. In a second step of pre-drying, therefore, the current control device 36 is controlled by the process control device 24 to deliver power to the heating elements 18 according to predefined current control profiles 38.

The time duration $t_{duration}$ counter starts when pressing the start button for time measurement. The furnace head 12 is partially opened. The temperature is at a low level $T_{VT-1}$ for pre-drying the dental restoration part. In this section, the heating element 18 is controlled with the current control device 36 by the process control device 24. After a defined time, the pre-drying process is completed and the furnace head 12 is completely closed. The process control device 24 then switches to a regular operation with the control device 34. In five different stages, the temperature in heating chamber 16 is increased and lowered, where a temperature level is temporarily maintained for a predetermined time according to the pre-selected programme. The temperature level is controlled by means of the temperature detection device 28, as described in FIG. 3.

In the first three stages, the temperature level is increased and in the following two stages, the temperature level is slowly gradually lowered. In the third stage at time $t_{s4}$, the maximum temperature is measured and recorded as parameter $T_{max}$ in order to estimate the cooling time $t_{cool}$. At time $t_K$, the opening temperature $T_{open}$ of the heating chamber 16 is measured and stored as a second parameter. As a third parameter, the total programme running time $t_{duration}$ is on measured, the furnace head 12 is opened completely with the cover 14 and the cooling time $t_{cool}$ estimated or calculated as explained and described below.

After expiry of the cooling time $t_{cool}$, the receiving plate travels upwards and releases the dental restoration part 20. Now a further dental restoration part 20 in a second procedure according to a second programme can be used for a heat-treatment process. This is indicated by "Pre-drying 2" and "Programme 2" in FIG. 5.

FIG. 6 shows an abstracted time t-current I-diagram for a heating element 18. This diagram serves as an example for various heating elements 18. At the pre-drying process step for current-controlled pre-drying, which could be used for three different pre-drying programmes, for example, all programmes have in common that a large current I1 is impressed for a short time t1 and then a small current I2 is impressed for a longer time t2. The programmes differ depending on the material of the heating elements 18 and the subsequent heat treatment process, for example crystallisation, glazing and/or sintering or similar processes.

The following figures show schematic diagrams with a Y-axis as the opening position of the furnace head 12 in relation to the cover 14 and the three modes programme time, cooling time and operational readiness over a running time t as X-axis.

FIG. 7 shows a first, basic programme sequence with regard to the usual cooling time of the dental furnace 10. The duration of the cooling time $t_{cool}$ is determined by an estimation using the programme parameters of the programme runtime including the time of pre-drying $t_{duration}$, $T_{MAX}$ and $T_{open}$.

The following figures show variants of the process section of cooling.

FIG. 8 shows a programme termination in one of the five stages shown in FIG. 5. A cooling time $t_{cool}$ is then determined from the three parameters determined during the programme $t_{duration}$, $T_{max}$ and $T_{open}$. Before the end of the cooling time $t_{cool}$, which is realized by means of a timer, no new programme 2 for heat treatment can be started.

Figures 9, 10, 11:
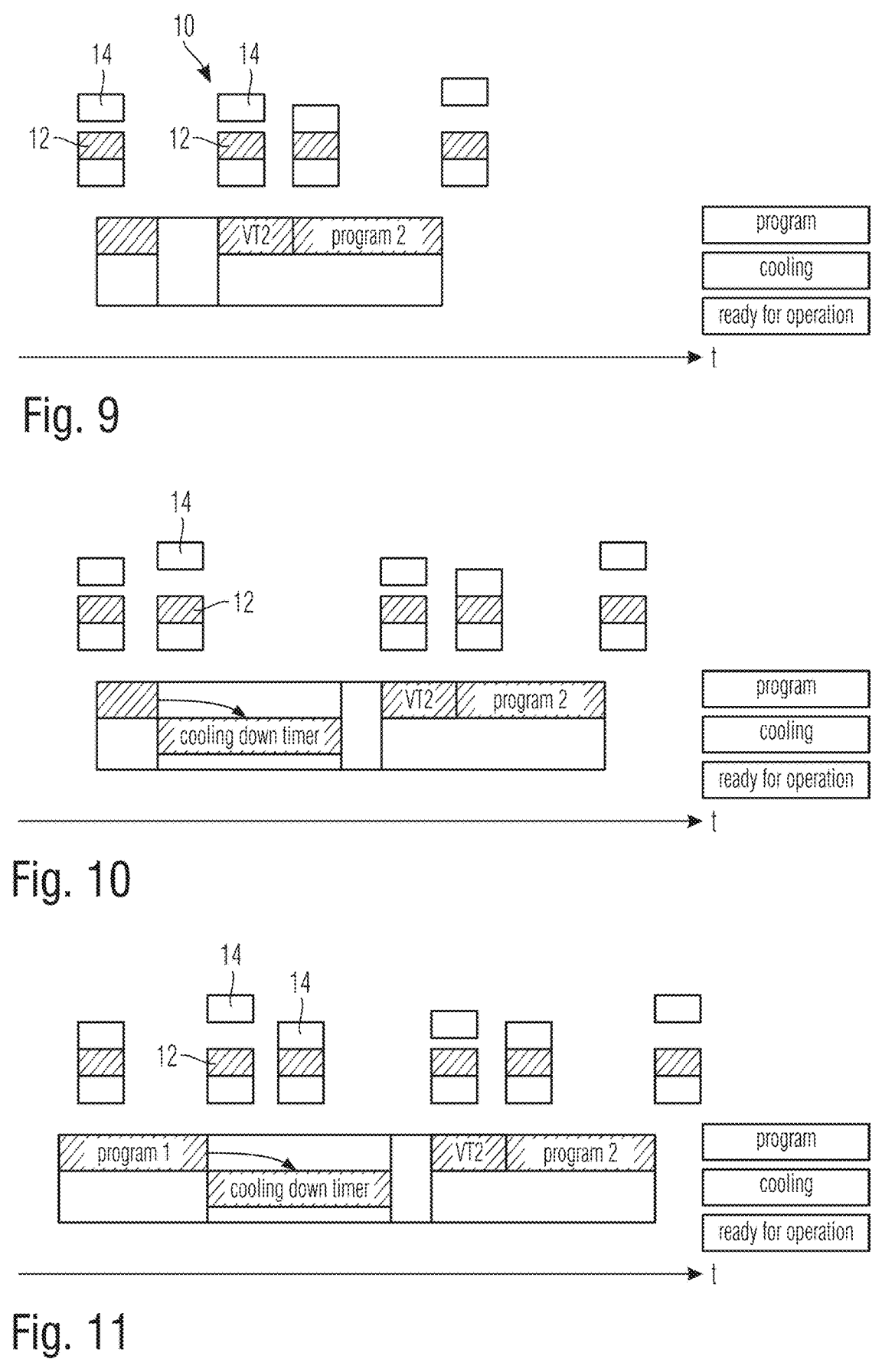

FIG. 9 shows the variant if it is cancelled within the first 20 seconds of pre-drying. Then no waiting time is necessary for cooling. Pre-drying and the following heat treatment programme can be started immediately.

FIG. 10 shows a variant if a programme is aborted during the previous one: Only the parameter $t_{duration}$ is recorded. The temperatures $T_{max}$ and $T_{open}$ are not known and are assumed to be 700° C. (maximum holding temperature). From these parameters, the cooling time for the timer can now be determined. No new programme can be started before the cooling period has expired.

FIG. 11 shows another variant when the furnace head 12 is closed during cooling down. A restart of a new programme is then allowed from an OT1 temperature below 400° C. The OT1 temperature is not measured until 120 seconds after closing. The cooling time of the timer is no longer taken into account.

Figure 12:
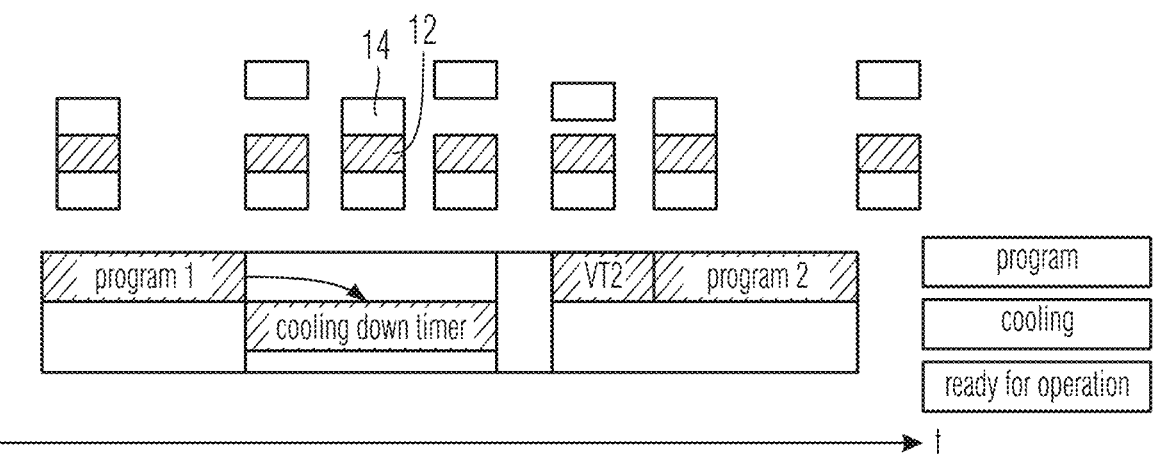
FIG. 12 shows a sixth cooling variant.

FIG. 12 shows a further variant. If the furnace head 12 is closed and reopened during the cooling, a restart is allowed after the cooling time measured by the timer.

Figure 13:
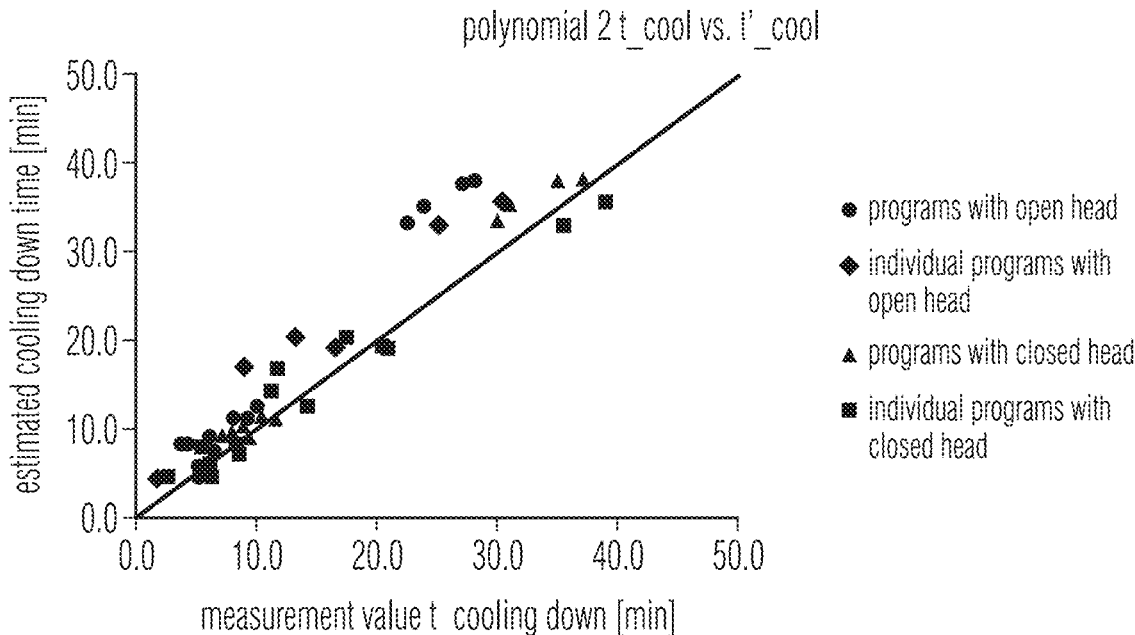
FIG. 13 shows a measured value-estimation value diagram for cooling the dental furnace.

FIG. 13 shows a measured value estimation value diagram regarding the cooling time $t_{cool}$ for cooling the dental furnace. From correlation analyses, it has surprisingly been found that the following three variables described above are very informative as parameters from programmes for determining the necessary cooling time of the heating chamber, i.e., the combustion chamber, after the end of the programme:

$T_{max}$=maximum temperature of the programme $T_{open}$=last temperature of the combustion chamber before head opens and $t_{duration}$=duration of the programme incl. Pre-drying About $t_{duration}$: If no pre-drying is carried out, the programme duration $t_{duration}$ consists only of the time for sintering/glazing/crystallization. Analysis of the measurement data describes a very large correlation of over 99.7% of the relationship $t_{duration}*a3+T_{max}*a1+T_{open}*a2+b'$ About the cooling time ' $t_{cool}$': there is a very large correlation of over 99.7%>Korr (tcool, f(tduration, $T_{max}$, Topen)

This suggests that it is possible to estimate the cooling time from the empirically determined formula. The coefficients a1, a2, a3 and b were determined by regression.

$$t'_{cool}=a11*t_{duration}+a2*T_{max}+a3*T_{open}+b$$

Even better results were surprisingly achieved with the 2nd order polynomial. These values are shown in FIG. 13.

$$t'_{cool}=a11*t_{duration}^2+a10*t_{duration}+a21*T_{max}^2+a20*T_{max}+a31*T_{open}^2+a30*T_{open}+b$$

Surprisingly, in this way a polynomial was found that estimates the cooling time on the basis of a total of 27 programmes. This has been verified with 11 standard programmes and 16 individual programmes.

In so doing the lowest possible square error sum ($t'_{cool}$-$t_{cool}$) estimation—measured value was determined. The maximum square estimate of the cooling time less than 25, if ($t'_{cool}$-$t_{cool}$) is negative, should be added up quadratically.

The cooling time estimate has the following validities:

The validity of the polynomial is given in the following space $0 < t_{duration} < 70$ min $t < 0$ min, not possible $t_{duration} > 70$ min, for estimation $t_{duration} = 70$ min assumed $400°$ C.$< T_{max} <= 1560°$ C.

$T_{max} < 400°$ C.$\rightarrow$no cooling necessary $T_{max} > 1560°$ C.$\rightarrow$furnace defective $400°$ C.$< T_{open} <= 1200°$ C.

$T_{open} < 400°$ C.$\rightarrow$no cooling necessary $T_{open} > 1200°$ C.$\rightarrow$furnace defective In the cooling time estimate with respect to the polynomial 2nd order, it can be seen from FIG. 13 that for all programmes the estimation of the cooling time is greater than the measured cooling time.

The estimated cooling times of some individual programmes with a closed furnace head tend to be a bit too short, but acceptably close to the requirement (max. 3 min underestimated, this corresponds to approx. $\Delta T_{OT1} = 30°$ C.).

On average, a 5 to 10% longer cooling than necessary is calculated with a closed furnace head. On average, this means about 2 min, i.e., 25-30% more extensive cooling than necessary with the furnace head open. With short programmes, there is hardly any overestimation of the cooling time.

FIG. 14 shows a table with comparisons of the cooling time under different process conditions, measured, estimated and stored in a lookup table. The lookup table includes values determined from scenarios in the most extreme case. Consequently, they are extremely conservative. The estimation using the formula leads to a significantly better cooling time estimation than the original variant with a lookup table.

In summary, it can therefore be stated that perfect sintering with the objects in the most extreme case, i.e., worst case objects, so-called hedgehog and ellipsoid, is possible after cold start.

A perfect sintering with objects in the most extreme case, i.e., hedgehog and ellipsoid, after 35 minutes of cooling according to boundary profile is feasible with the furnace head closed. The formula with a polynomial of 2nd order gives reliable results for the estimation of the cooling time.

One of ordinary skill in the art will recognize the options to be used for the various components of the invention, including, but not limited to the following embodiments.

In one or more embodiments, the various control devices can be configured as a microcontroller/Programmable Logic Controller (PLC), a Proportional-Integral-Derivative (PID) controller, and so forth.

The control device can include a processor, a memory, and a communications interface. The processor provides processing functionality for the control device and can include any number of processors, micro-controllers, or other processing systems, and resident or external memory for storing data and other information accessed or generated by the control device. The processor can execute one or more software programs that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The memory is an example of tangible, computer-readable storage medium that provides storage functionality to store various data associated with operation of the control device, such as software programs and/or code segments, or other data to instruct the processor, and possibly other components of the control device, to perform the functionality described herein. Thus, the memory can store data, such as a program of instructions for operating the system (including its components), and so forth. In embodiments of the disclosure, the memory can be integral with the processor, can comprise stand-alone memory, or can be a combination of both.

The memory can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the cable 100 and/or the memory 154 can include removable integrated circuit card (ICC) memory, such as memory provided by a subscriber identity module (SIM) card, a universal subscriber identity module (USIM) card, a universal integrated circuit card (UICC), and so on.

A communications interface can be operatively configured to communicate with components of the system. It should be noted that while the communications interface is described as a component of a control device, one or more components of the communications interface can be implemented as external components communicatively coupled to the system via a wired and/or wireless connection. The system can also comprise and/or connect to one or more input/output (I/O) devices, including, but not necessarily limited to: a display, a mouse, a touchpad, a keyboard, and so on.

The invention claimed is:

1. A dental furnace comprising a heating chamber, at least one electric heating element, a power controller for the heating element, a temperature detector with which a temperature in the heating chamber is detected, and a process controller, wherein the process controller is connected to the temperature detector and to the power controller for regulating the power controller, wherein the temperature detector is designed for direct detection of a temperature of a dental restoration part, wherein the process controller comprises a current controller, wherein the dental furnace is for pre-drying dental restoration parts or for debinding the dental restoration parts, wherein the temperature detector comprises a thermocouple or an optical temperature measuring system, and wherein the current controller is configured to control the power controller in absence of a measurement signal of the temperature detector.

2. The dental furnace according to claim 1, wherein the current controller is designed with a function of transmitting control signals to the power controller, so that a constant current is delivered to the heating element at a certain time over a defined time.

3. The dental furnace according to claim 1, wherein the current controller has at least one stored current control profile, which is run by the current controller over a period of time, so that the power controller imprints a current according to the current control profile over time into the heating element.

4. The dental furnace according to claim 3, wherein a specific current control profile is selected among different current control profiles depending on a recorded temperature in the heating chamber and/or on the material of the heating element.

5. The dental furnace according to claim 1, wherein the temperature detector comprises the heating element and the temperature of the heating element is detected by determining the resistance of the heating element or by measuring the current when applying a voltage or measuring a voltage drop when flowing current through the heating element.

6. A method for the operation of a dental furnace, wherein the dental furnace is for pre-drying dental restoration parts or for debinding dental restoration parts and comprises a heating chamber and at least one electric heating element, which is controlled by a power controller, a temperature detector, a process controller connected to the temperature detector, the power controller connected to the process controller, the process controller having a current controller, wherein the temperature detector comprises a thermocouple or an optical temperature measuring system, and wherein the current controller is configured to control the power controller in absence of a measurement signal of the temperature detector, said method comprising the following steps:
pre-drying or debinding the dental restoration part, directly detecting temperature of the dental restoration part in the heating chamber by the temperature detector, regulating the power controller by the process controller, controlling the power controller by the current controller in the absence of a measurement signal of the temperature detector.

7. The method according to claim 6 comprising wherein, prior to the start of pre-drying or debinding, the process controller checks whether the temperature of the heating chamber is below a temperature threshold detected by the temperature controller and switches to a current control mode in the process controller when the temperature of the heating chamber is below the temperature threshold so that the heating element is controlled by the current controller.

8. The method according to claim 6 comprising wherein, when debinding or pre-drying, as soon as an unusual increase in temperature in the heating chamber is detected by the temperature detector and transmitted to the process controller, the power controller is controlled via the current controller with a current control profile which counteracts exothermal reactions.

9. The method according to claim 6 comprising wherein the heating element is fundamentally regulated by the process controller in a regular operation, when there is negative pressure in the heating chamber, during a heat treatment process of the dental restoration part, and wherein when cold air is inlet into the heating chamber it is switched to a current control operation in the process controller, so that the heating element is controlled by the current control system.

10. The method according to claim 6 comprising wherein the current control operation is used in a closed, partially open or completely open dental furnace, or regardless of a top opening position of the dental furnace.

11. The method according to claim 6 comprising wherein the heating chamber is cooled before pre-drying below a defined temperature threshold and the heating chamber is partially closed during pre-drying.

12. A method for the operation of a dental furnace, wherein the dental furnace comprises a heating chamber and at least one electric heating element that is controlled by a power controller, a temperature detector, a process controller connected to the temperature detector, the power controller connected to the process controller, and the process controller having a current controller, said method comprising the following steps:
the temperature detector directly detects temperature of a dental restoration part in the heating chamber, the process controller regulates the power controller, and the current controller controls the power controller in an absence of a measurement signal of the temperature detector, wherein a waiting time $t_{cool}$ is started by the process controller by a time or as soon as a heat treatment is stopped by supply of electrical energy and the heating chamber is opened and the waiting time $t_{cool}$ is terminated at a time when the temperature of the heating chamber has fallen below a predetermined value.

13. The method according to claim 12 comprising wherein a waiting time $t_{cool}$ is calculated from at least three parameters: total heat treatment time $t_{duration}$ of the dental restoration part including a pre-drying phase and the heat treatment process, a maximum temperature achieved $T_{max}$ and a temperature achieved in a cooling phase $T_{open}$ at a time when the heating chamber is opened, wherein the temperature is detected by the temperature detector.

14. The method according to claim 13 comprising wherein the waiting time $t_{cool}$ is calculated from parameters by a formation of a polynomial, wherein a maximum value of the waiting time is set, and wherein the maximum value is used when the calculation results in a value above the maximum value.

15. The method according to claim 13 comprising wherein no waiting time is calculated when a heat treatment process is aborted after the start of a pre-drying phase.

* * * * *